Figure 1:
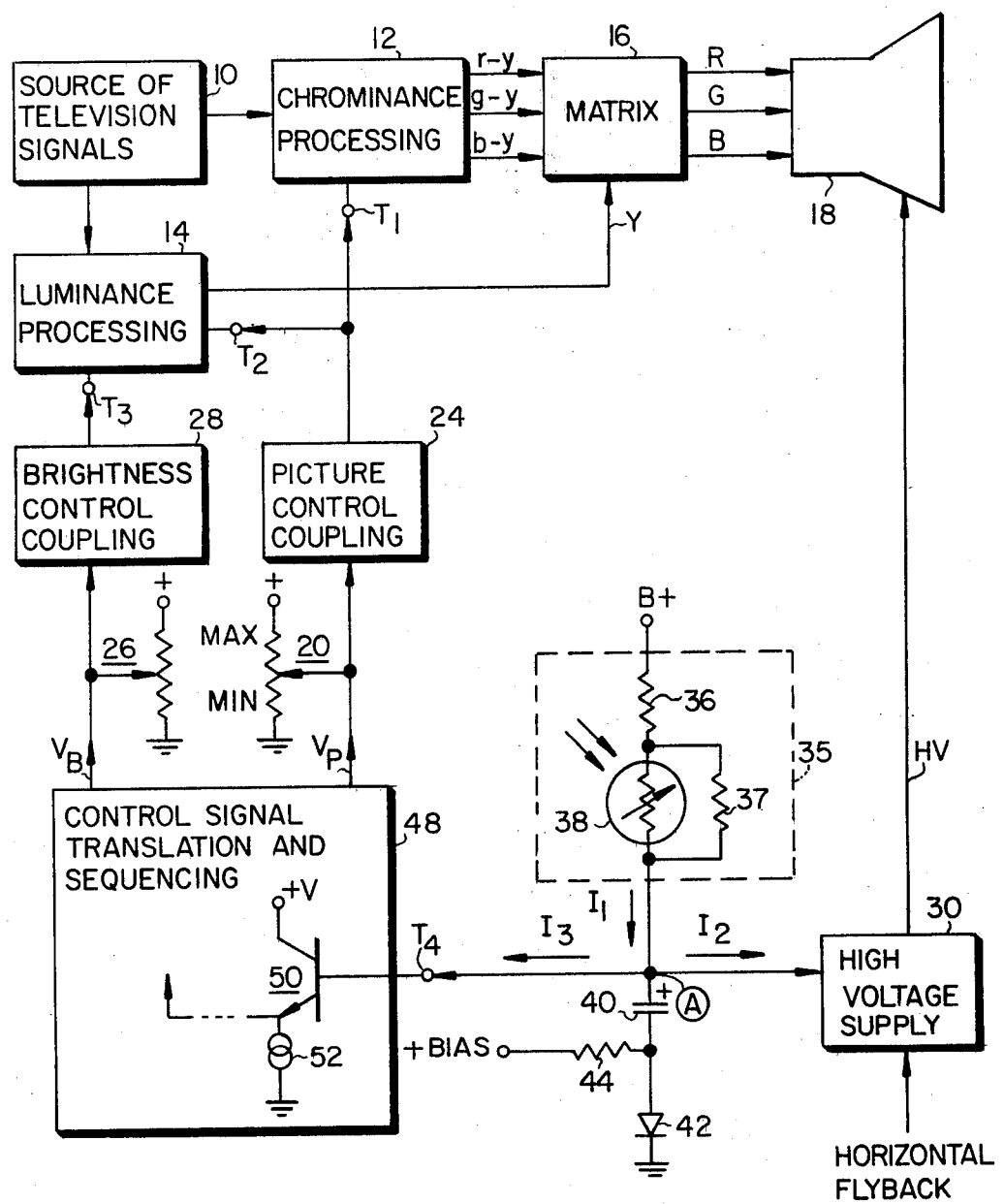

United States Patent [19]

Fuhrer

[11] 4,451,849
[45] May 29, 1984

[54] PLURAL OPERATING MODE AMBIENT LIGHT RESPONSIVE TELEVISION PICTURE CONTROL

[75] Inventor: Jack S. Fuhrer, Carmel, Ind.

[73] Assignee: RCA Corporation, New York, N.Y.

[21] Appl. No.: 391,415

[22] Filed: Jun. 23, 1982

[51] Int. Cl.³ .......................................... H04N 9/535
[52] U.S. Cl. ..................................... 358/161; 358/169
[58] Field of Search ................ 358/21 R, 27, 39, 160, 358/161, 169, 243

[56] References Cited

U.S. PATENT DOCUMENTS

| | | | |
|---|---|---|---|
| 3,104,281 | 9/1963 | Wolff | 178/7.5 |
| 3,755,619 | 8/1973 | Lovely | 358/161 |
| 4,081,838 | 3/1978 | Wheeler | 358/169 |
| 4,090,216 | 5/1978 | Constable | 358/161 |

Primary Examiner—Michael A. Masinick
Attorney, Agent, or Firm—E. M. Whitacre; P. J. Rasmussen; R. H. Kurdyla

[57] ABSTRACT

The contrast of an image reproduced by a television receiver is manually adjustable by means of a picture control potentiometer, and automatically adjustable by means of an ambient light responsive circuit. Automatic picture control is accomplished selectively, independent of the manual control setting, in accordance with a predetermined combination of ambient light and image brightness levels such that the contrast of bright images, rather than the contrast of all images, is automatically reduced in low ambient light. In a preferred embodiment such automatic picture control is accomplished by using the light responsive circuit to control the threshold operating level of an automatic kinescope beam current limiter of the receiver.

9 Claims, 2 Drawing Figures

PLURAL OPERATING MODE AMBIENT LIGHT RESPONSIVE TELEVISION PICTURE CONTROL

This invention concerns apparatus for automatically controlling the magnitude of a television signal in response to the level of ambient light in the area in which the television picture is being viewed on the display screen of an image reproducing device such as a kinescope. In particular, this invention concerns such apparatus wherein automatic picture control is accomplished selectively as a function of the ambient light level and the brightness of the picture being displayed.

A video signal processing and display system such as a television receiver commonly includes a viewer adjustable control for manually adjusting the peak-to-peak amplitude of television signals to achieve a desired level of contrast for a picture displayed by an image reproducing kinescope of the system. Some receivers also include provision for automatically controlling picture contrast as a function of the ambient lighting conditions in the area in which the displayed picture is being viewed. This is typically accomplished by means of a light sensitive variable conduction device, such as a light dependent resistor (LDR) or equivalent device, positioned close to the face of the kinescope display screen so that substantially the same amount of ambient light strikes both the LDR and the kinescope display screen. The impedance of the LDR typically varies inversely with the level of ambient light so that picture contrast increases and decreases as the ambient light level increases and decreases.

In a typical viewing situation, a viewer will adjust the manual picture (contrast) control to produce a picture display with a pleasing amount of contrast, or picture intensity. This setting is often made when the area in which the picture is being viewed is well lighted, such as during daylight hours in a reasonably bright room. In general, the viewer will be satisfied with this picture contrast setting for a wide variety of picture content even as the ambient light in the viewing environment diminishes, such as during evening hours. As the ambient light diminishes, the light sensitive automatic contrast control device will respond by automatically reducing the picture contrast in proportion to the decreasing ambient light, thereby reducing the picture intensity. However, it is herein recognized that this automatic picture control operation in low ambient light can be undesirable with respect to displayed scenes of average brightness, and particularly with respect to displayed scenes of low brightness (e.g., nightime scenes or dim bedroom scenes), since the automatic action of the LDR in reducing picture contrast would cause such scenes to appear lacking in intensity. In such situations the viewer could manually readjust the contrast control, or do nothing and contend with a picture that is less than pleasing in intensity. Neither of these is considered to be a satisfactory option, since it is considered preferable to provide a pleasing picture display consistent with requiring a minimum amount of manual picture adjustment on the part of the viewer.

Thus in accordance with the principles of the present invention there is disclosed herein a selectively operative ambient light sensing automatic picture control arrangement which acts primarily to reduce the contrast of bright displayed pictures in low ambient light, rather than reducing the contrast of all scenes in low ambient light, as a function of a predetermined combination of the ambient light level and the brightness level of displayed pictures. In particular, the disclosed arrangement accomplishes this result independent of the setting of the manually adjustable contrast control.

Figure 2:
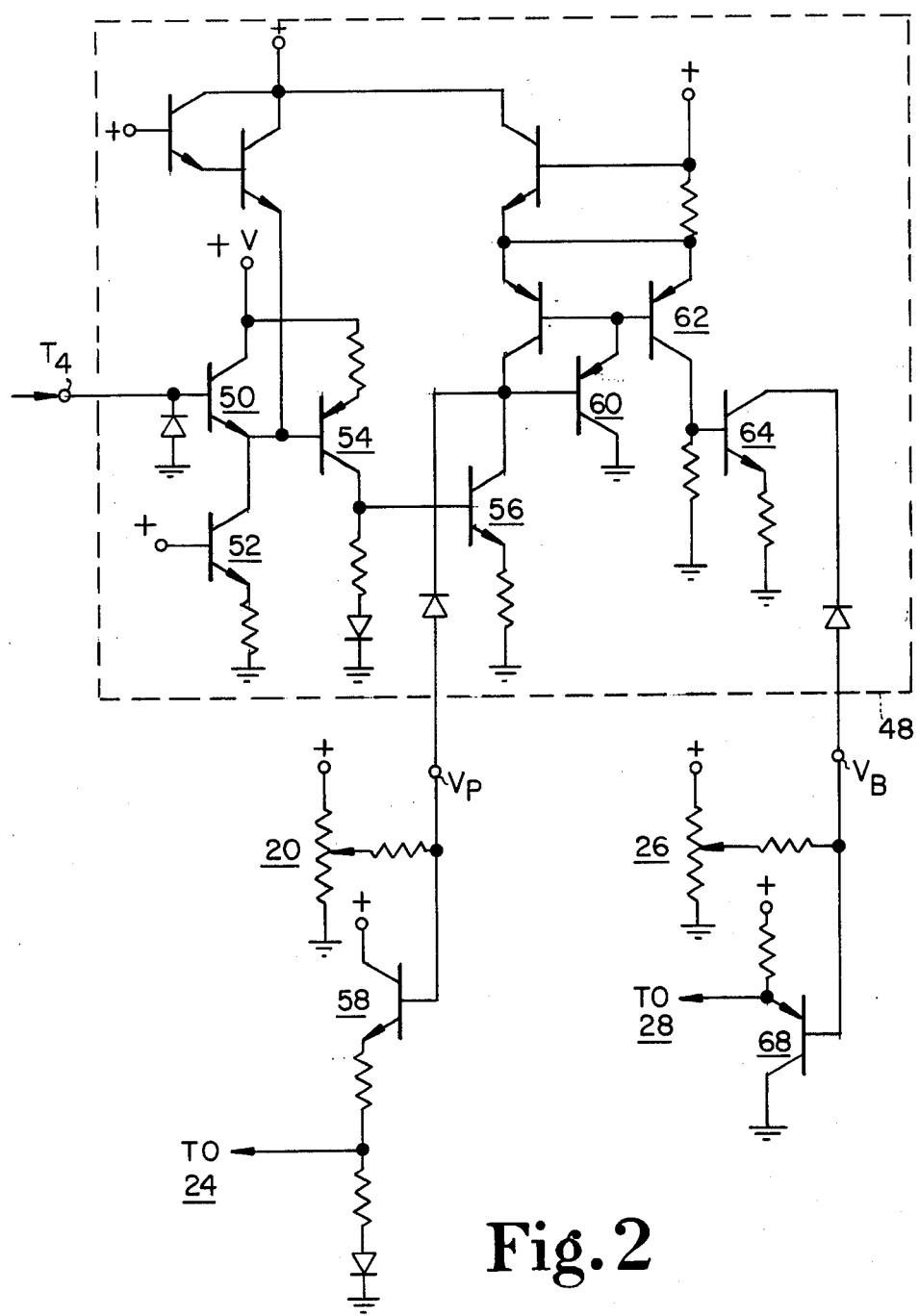

In accordance with a feature of the invention the ambient light sensing device operates in conjunction with an automatic kinescope beam current limiting circuit of the receiver, by automatically adjusting the beam current limiter threshold operating level as a function of ambient light levels. In the drawing:

FIG. 1 shows a portion of a television receiver including an automatic picture control network according to the present invention; and FIG. 2 shows circuit details of a portion of the arrangement of FIG. 1.

In FIG. 1, a source of color television signals 10 supplies the chrominance component of the television signal to a chrominance processor 12 for developing color difference signals r-y, g-y and b-y. Chrominance processor 12 includes, among other conventional color signal processing circuits, a gain controllable signal amplifier which responds to a variable gain control voltage applied to a gain control input terminal $T_1$ for varying the peak-to-peak amplitude of the chrominance signal in accordance with the level of the control voltage. Source 10 supplies the luminance component of the television signal to a luminance signal processor 14, which provides an amplified luminance output signal Y. Processor 14 includes a gain controllable signal amplifier which responds to a variable gain control voltage applied to a gain control input terminal $T_2$ for varying the peak-to-peak amplitude of the luminance signal. A picture brightness control voltage is applied to an input terminal $T_3$ of processor 14. The gain controlled luminance signal from processor 14 and the gain controlled color difference signals from processor 12 are combined in a matrix amplifier 16 for producing color image representative signals R, G and B. A color kinescope 18 responds to these signals for reproducing a color image on the display screen of the kinescope.

The gain control voltages applied to terminals $T_1$ and $T_2$ of signal processors 12 and 14 are derived from a viewer adjustable manual picture control comprising a potentiometer 20. A variable control voltage derived from the wiper of potentiometer 20 is applied to signal processors 12 and 14 via a picture control voltage coupling network 24, which provides suitable translation of the gain control voltages applied to signal processors 12 and 14. The signal gains of chrominance processor 12 and luminance processor 14 are controlled simultaneously in accordance with the setting of picture control 20, so that the amplitudes of the luminance and chrominance signals are maintained in a desired relationship as control 20 is adjusted. The brightness control voltage applied to terminal $T_3$ of luminance processor 14 is derived from a viewer adjustable potentiometer 26. A variable control voltage derived from the wiper of control 26 is applied to terminal $T_3$ via a brightness control voltage coupling and translating network 28, which provides suitable translation of the brightness control voltage applied to luminance processor 14. Adjustment of control 26 serves to vary the DC level of the luminance signal, and thereby the brightness of a reproduced image. As will be discussed, the brightness control voltage derived from control 26 and the picture control voltage derived from control 20 are respectively modified by voltages $V_B$ and $V_P$ when the automatic kinescope beam current limiter circuit of the receiver operates.

Kinescope 18 is supplied with a high operating voltage (anode voltage) HV from a high voltage supply 30 (e.g., a voltage multiplier) which responds to horizontal flyback signals derived from deflection circuits of the receiver, and to a kinescope beam resupply current $I_2$. The magnitude of resupply current $I_2$ is proportional to the beam current conducted by the kinescope.

A current source including a variable impedance network 35 and an associated operating potential B+ provides a reference current $I_1$ which divides into resupply current $I_2$ and a control current $I_3$, as will be discussed. Variable impedance network 35 comprises resistors 36, 37 and a light dependent resistor (LDR) 38. LDR 38 is located in proximity to the viewing screen of kinescope 18 so that substantially equal amounts of ambient light strike both LDR 38 and the display screen of kinescope 18. The resistance of LDR 38 respectively increases and decreases as the ambient light level decreases and increases, thereby causing the impedance of network 35 to vary with changes in ambient light. Accordingly, the impedance of network 35 respectively increases and decreases as the ambient light level decreases and increases, causing the level of reference current $I_1$ to correspondingly decrease and increase.

A filter network including an average responding charge storage capacitor 40, a conductive diode 42 and an associated bias resistor 44 comprises a kinescope beam current sensing network, as described in U.S. Pat. No. 4,167,025 - Willis. A voltage developed on capacitor 40 at node A varies in accordance with the level of average kinescope beam current in the beam current limiting mode.

The general operation of the automatic beam current limiter will first be described. For this purpose it is assumed that the beam limiter is intended to limit unsafe levels of excessive beam current conduction above 2.0 milliamperes. Thus the current source including network 35 supplies a reference current $I_1$ of approximately 2.0 milliamperes, which corresponds to the maximum beam limiter threshold level. It is also assumed that this maximum reference current is established for the condition wherein LDR 38 exhibits a very small minimum impedance such as would occur in a normally expected brightest viewing environment, whereby the level of reference current $I_1$ is primarily determined by the value of resistor 36 in conjunction with the B+ supply voltage.

At node A reference current $I_1$ divides into resupply current $I_2$ and control current $I_3$. Current $I_2$ supplies the beam current demanded by the kinescope, and current $I_3$ flows into the input circuit of a beam limiting control signal translating and sequencing network 48, via an input terminal $T_4$. The average value of current $I_2$ is proportional to the average beam current conducted by the kinescope, which in turn is representative of the brightness of a displayed picture.

In the normal, non-beam limiting mode, the voltage developed at node A is sufficiently large to forward bias the base-collector junction of an input emitter follower transistor 50 included in network 48, whereby control current $I_3$ flows from the base to the collector of transistor 50. The forward biased base-collector junction acts as a voltage clamp with respect to input terminal $T_4$ and node A. The collector current of transistor 50 corresponds to current $I_3$, and the emitter current of transistor 50 is supplied by a current source 52. No beam limiting control action is produced as long as the base-collector junction of transistor 50 is forward biased, during which time terminal $T_4$ and node A are clamped to a voltage approximately 0.7 volts greater than the collector bias voltage (+V) of transistor 50. Also at this time, transistor 50 operates non-linearly with respect to variations of current $I_3$, whereby the emitter current and voltage of transistor 50 remain unchanged as a function of base current.

Automatic beam current limiting action commences when resupply current $I_2$ increases to the point where current $I_3$ diminishes to a level on the order of a few microamperes. When this occurs, the base-collector junction of transistor 50 becomes reverse biased, whereby node A is unclamped and exhibits a voltage which decreases with increasing resupply current $I_2$. Transistor 50 then operates linearly to produce an emitter control voltage which varies proportionally with variations of resupply current $I_2$ and the corresponding voltage at node A.

The emitter control voltage of transistor 50 is utilized to develop variable beam limiting control voltages $V_P$ and $V_B$ at the output of network 48. Specifically, variable control voltage $V_P$ is developed when excessive beam currents throughout a first range occur, in which case voltage $V_P$ serves to limit such excessive beam currents by reducing the amplitudes of the luminance and chrominance signals via gain control inputs $T_1$ and $T_2$ of chrominance processor 12 and luminance processor 14. Control voltage $V_B$ is developed in response to excessive beam currents throughout a second range having a magnitude greater than the magnitude of beam currents within the first range. In such case the picture control beam current limiting action is supplemented by reducing the DC level of the video signal (i.e., reducing image brightness) via control voltage $V_B$ and terminal $T_3$ of luminance processor 14. A sequentially operating beam current limiting system of this type is described in U.S. Pat. No. 4,253,110 of L. A. Harwood, et al.

It is noted that the magnitude of reference current $I_1$, and thereby the threshold operating level of the automatic beam current limiter system, is a function of the variable impedance of ambient light responsive LDR 38. LDR 38 operates in conjunction with the beam current limiter to selectively reduce the contrast of bright displayed images in the presence of low ambient light, rather than reducing the contrast of all displayed images in low ambient light. This automatic picture control action is accomplished independent of the setting of manual picture control 20.

In low ambient light the impedance of LDR 38 increases, thereby increasing the impedance of network 35. This results in a lower value of the beam limiter threshold reference current $I_1$. The threshold level of the automatic beam current limiter is a function of ambient light dependent reference current $I_1$ such that, for a given level of beam current and associated resupply current $I_2$, in low ambient light the beam limiter is enabled to act sooner when the reference current is reduced for reducing the available resupply current. The beam limiter then becomes more sensitive to beam currents representative of increasing picture brightness, and will accordingly act sooner to reduce video signal gain and picture contrast. Thus in low ambient light, the likelihood of contrast being reduced increases as picture brightness increases. Preferably the operating parameters of the system are chosen so that, in low ambient light, automatic contrast control is not provided for scenes of low to average brightness, but that automatic contrast control is provided for scenes of greater than average brightness.

Therefore in low ambient light contrast control is essentially automatic since automatic contrast control via the beam limiter network dominates the setting of the manual contrast control potentiometer. Manual contrast control progressively dominates for increasingly higher levels of ambient light, as the beam limiter threshold operating level progressively increases whereby the likelihood of automatic beam limiter operation decreases compared to the low ambient light condition.

Thus the ambient light responsive automatic picture control is not continuous but rather selective as a function of both ambient light level and picture brightness. For a given (e.g., low) ambient light level, automatic picture control will be initiated only when a picture of sufficient brightness is being displayed. The circuit values (e.g., the values of the components of network 35) can be tailored to produce a desired automatic picture control effect based upon a predetermined combination of the ambient light and image brightness parameters. The described automatic picture control system operates independently of the setting of manually adjustable picture control potentiometer 20. Otherwise, the automatic picture control function based upon a desired predetermined combination of ambient light and picture brightness levels would be unpredictably a function of the setting of control 20.

The purpose and advantages of the predetermined, selectively operative automatic picture control function would be defeated if automatic picture control is influenced by the setting of manual control 20. In such case the manual control may be positioned such that automatic picture control via LDR action reduces the contrast of low brightness scenes in low ambient light, thereby undesirably causing such scenes to appear lacking in intensity.

The described selectively operative automatic picture control predictably provides the viewer with what is considered to be a more pleasing picture contrast level particularly in low ambient light, compared to systems wherein the ambient light sensor reduces picture contrast in low ambient light for all picture conditions. With the latter systems, a viewer may consider it necessary to manually increase picture contrast in order to achieve a picture of sufficiently pleasing intensity in the case of moderate or low brightness scenes viewed in low ambient light.

The described apparatus is particularly advantageous when used with a video display system employing a relatively small display screen (e.g., as is common with many portable television receivers). Small screen systems display image detail which is smaller and more difficult to discern compared with image detail displayed by large screen systems. The smaller image detail of small screen systems is even more difficult to discern when the contrast of low to moderate brightness images is automatically reduced in low ambient light, since such contrast reduction results is reduced image intensity. This undesirable effect does not result when a small screen system employs the described apparatus according to the present invention, wherein low to moderate brightness scenes viewed in low ambient light exhibit greater image contrast and picture intensity compared to a small screen system wherein the contrast of all scenes is automatically reduced in low ambient light.

The described apparatus is particularly useful in a television receiver wherein the viewer adjustable manual contrast control has been eliminated as an economy measure. In such a receiver the signal gain of the video channel would be pre-set at a level sufficient to produce image contrast of pleasing intensity. Contrast control would occur automatically only when a sufficiently bright image is sensed as being viewed in low ambient light, in which event contrast will be reduced.

The network of FIG. 2 comprises circuit details of control signal translating and sequencing circuit 48. The control signal applied to input terminal $T_4$ is coupled via input follower transistor 50, transistor 54 and transistor 56, which provides control voltage $V_P$ from its collector output. Control voltage $V_P$ together with the manually adjustable picture control voltage from the wiper of potentiometer 20 are supplied of coupling network 24 via emitter follower transistor 58. When transistor 50 has a current gain (Beta) of 100, and current source 52 supplies a current of 200 microamperes, then only two microamperes of base current is needed to keep voltage follower transistor 50 operating in a linear region in the beam current limiting mode. For the purpose of beam current limiting via the brightness control function, the control signal from the collector of transistor 56 is coupled via a network including transistors 60, 62 and transistor 64 which provides control voltage $V_B$ from its collector output. An emitter follower transistor 68 supplies this voltage, together with the manually adjustable brightness control voltage from potentiometer 26, to network 28.

What is claimed is:

1. In a video signal display system including a video signal processing channel; an image reproducing device for producing a picture display on a viewing screen in response to output video signals from said signal channel; and manually adjustable picture contrast control means for manually controlling the gain of said signal channel; automatic picture contrast control apparatus for automatically controlling the gain of said signal channel, comprising:

sensing means for providing output signals representative of the ambient light level striking said display screen, and representative of the average video signal level; and threshold control means independently operative of the setting of said manual contrast control means and responsive to said representative signals for selectively providing to said video channel an automatic contrast control voltage for reducing picture contrast proportionally with reduced ambient light levels when a prescribed combination of ambient light level and average video signal level causes an operating threshold of said control means to be exceeded.

2. Apparatus according to claim 1, wherein said sensing means comprises means for providing a first signal representative of ambient light levels within a first range of low ambient light levels and a second range of relatively higher ambient light levels, with respect to a given level; and means for providing a second signal representative of the average video signal level within a first range of low average video signal levels and a second range of relatively higher average video signal levels, with respect to a given level; and wherein said operating threshold of said control means is primarily subject to being exceeded in response to the simultaneous occurrence of said first signal being representative of low ambient light levels within said first range, and said second signal being representative of high average video signal levels within said second range.

3. Apparatus according to claim 2, wherein said means for providing said first representative signal comprises light responsive variable conduction means positioned relative to said viewing screen such that proportional amounts of ambient light strike said light responsive means and said viewing screen, and said means for providing said second representative signal comprises means for monitoring the average beam current conducted by said image reproducing device.

4. In a video signal display system including a video signal processing channel; a kinescope for producing a picture display on a viewing screen associated therewith in response to video signals from said channel; manually adjustable picture contrast control means for manually controlling the signal gain of said channel; and an automatic kinescope beam current limiter network for monitoring the level of the picture brightness representative average current conducted by said kinescope and modifying the signal gain of said video channel in a direction to limit excessive kinescope beam current when beam current above a threshold level is sensed; automatic picture contrast control apparatus comprising:

light responsive variable conduction means positioned relative to said viewing screen such that proportional amounts of ambient light strike said light responsive means and said viewing screen; and means for coupling said light responsive means to said automatic kinescope beam current limiter network for varying the beam limiter threshold operating level in accordance with variations in the level of ambient light, independent of the setting of said manually adjustable gain control means, said threshold being varied in response to a low ambient light condition in a direction for increasing the sensitivity of the beam limiter to high average beam currents representative of high picture brightness.

5. Apparatus according to claim 4, wherein said system includes a high voltage supply for said kinescope; and a source of reference current coupled to said high voltage supply for providing a kinescope beam resupply current thereto, the average level of said resupply current being representative of the average beam current conducted by said kinescope; and wherein said light responsive means modifies the level of said reference current to thereby modify the threshold operating level of said beam current limiter as a function of ambient light levels.

6. Apparatus according to claim 5, wherein:

said beam current limiter network comprises a threshold switching device providing an output control signal for modifying the signal gain of said video channel when a threshold level of said device is exceeded, said device having a control input coupled to a circuit node via a control current path;

said high voltage supply has a kinescope beam resupply current input coupled to said node via a resupply current path;

said source of reference current provides a reference current to said node comprising first and second current components, said first component being conducted from said node to said threshold device via said control current path, said second component being conducted from said node to said high voltage supply via said resupply current path; and said light responsive means varies the impedance of said reference current source, to thereby vary the level of said reference current, as a function of ambient light levels.

7. Apparatus according to claim 6, wherein said first and second current components vary in a mutually complementary sense with variations of the beam current conducted by said kinescope.

8. Apparatus according to claim 7, wherein said threshold device comprises a transistor with a base input control electrode coupled to said control current path, and with collector and emitter electrodes coupled to points of operating potential, and wherein said output gain control signal is derived from the collector-emitter path of said transistor.

9. Apparatus according to claim 8, wherein said gain control signal is derived from said emitter of said transistor;

said transistor exhibits a forward biased base to collector junction prior to said threshold being exceeded; and said transistor exhibits a reverse biased base to collector junction when said threshold level is exceeded in response to a diminished level of said first current component conducted via said control current path.

* * * * *